United States Patent [19]
Leatherman et al.

[11] Patent Number: 5,734,851
[45] Date of Patent: Mar. 31, 1998

[54] MULTIMEDIA VIDEO/GRAPHICS IN FUEL DISPENSERS

[75] Inventors: Russel D. Leatherman, Summerfield; Walter L. Baker, III, Greensboro, both of N.C.

[73] Assignee: Gilbarco Inc., Greensboro, N.C.

[21] Appl. No.: 779,251

[22] Filed: Jan. 3, 1997

Related U.S. Application Data

[63] Continuation of Ser. No. 539,505, Oct. 6, 1995, abandoned, which is a continuation of Ser. No. 960,512, Oct. 13, 1992, abandoned.

[51] Int. Cl.[6] .................................................. B67D 5/08
[52] U.S. Cl. ........................................................ 395/329
[58] Field of Search ................................. 395/329, 972, 395/326, 330, 333, 339

[56] References Cited

U.S. PATENT DOCUMENTS

| | | | |
|---|---|---|---|
| 3,345,458 | 10/1967 | Cole et al. | 178/6.8 |
| 3,549,793 | 12/1970 | Ross | 178/5.4 |
| 3,710,017 | 1/1973 | Abe et al. | 178/6.8 |
| 3,898,644 | 8/1975 | Baxter | 340/324 |
| 3,936,868 | 2/1976 | Thorpe | 358/22 |
| 3,949,207 | 4/1976 | Savary et al. | 235/151 |
| 4,001,498 | 1/1977 | Morshita et al. | 358/160 |
| 4,070,695 | 1/1978 | Scholz et al. | 358/181 |
| 4,107,777 | 8/1978 | Pearson et al. | 364/465 |
| 4,185,300 | 1/1980 | Miyake et al. | 358/183 |
| 4,218,698 | 8/1980 | Bart et al. | 358/22 |
| 4,395,627 | 7/1983 | Barker et al. | 253/381 |
| 4,498,098 | 2/1985 | Stell | 358/22 |
| 4,568,976 | 2/1986 | Trammell | 358/148 |
| 4,577,229 | 3/1986 | Cierva et al. | 358/182 |
| 4,589,069 | 5/1986 | Endo et al. | 364/405 |
| 4,591,898 | 5/1986 | deBoer et al. | 358/36 |
| 4,630,754 | 12/1986 | Komukai | 222/28 |
| 4,631,588 | 12/1986 | Barnes et al. | 358/149 |
| 4,639,765 | 1/1987 | D'Hont | 358/19 |
| 4,644,401 | 2/1987 | Gaskins | 358/183 |
| 4,658,371 | 4/1987 | Walsh et al. | 364/550 |
| 4,680,622 | 7/1987 | Barnes et al. | 358/22 |
| 4,750,130 | 6/1988 | Shimamura et al. | 364/465 |
| 4,782,401 | 11/1988 | Faerber et al. | 358/335 |
| 4,843,547 | 6/1989 | Fuyama et al. | 364/405 |
| 4,999,709 | 3/1991 | Yamazaki et al. | 358/160 |
| 5,027,211 | 6/1991 | Robertson | 358/183 |
| 5,027,282 | 6/1991 | Hoollidge | 364/479 |
| 5,235,509 | 8/1993 | Mueller et al. | 364/405 |
| 5,353,219 | 10/1994 | Mueller et al. | 364/405 |
| 5,394,336 | 2/1995 | Warn et al. | 364/479 |

FOREIGN PATENT DOCUMENTS

| | | |
|---|---|---|
| 617588 | 8/1990 | Australia . |
| 0 284 764 | 10/1988 | European Pat. Off. . |
| 0 366 871 | 5/1990 | European Pat. Off. . |
| 1496984 | 1/1978 | United Kingdom . |
| PCT/ GB8800651 | 2/1989 | WIPO . |
| PCT/ AU8900051 | 8/1989 | WIPO . |

Primary Examiner—Phu K. Nguyen
Assistant Examiner—Cliff N. Vo
Attorney, Agent, or Firm—Rhodes Coats & Bennett, L.L.P.

[57] ABSTRACT

An apparatus for dispensing fuel at a retail site includes a fuel dispenser having a raster-scannable display of information to a customer. A circuit generates graphics information concerning transactions for display on the raster-scannable display. A video signal source supplies video signals to the fuel dispenser to be displayed on the raster-scannable display, and the fuel dispenser circuit means is capable of selectively directing graphics information concerning transactions or video signals or a combination of them to the raster-scannable display.

27 Claims, 9 Drawing Sheets

FIG. 4 VIDEO MIXER FUNCTIONAL DIAGRAM

MULTIMEDIA VIDEO/GRAPHICS IN FUEL DISPENSERS

This application is a continuation of application Ser. No. 08/539,505 filed Oct. 6, 1995, now abandoned, which is a file wrapper continuation of application Ser. No. 07/960,512 filed Oct. 13, 1992 and now abandoned.

BACKGROUND OF THE INVENTION

The present invention relates to an improved multimedia display for raster-scannable displays, and the provision of multimedia displays in gasoline dispensers.

Gasoline dispensers have evolved over the years from having mechanical dial readouts to LED displays to more recent liquid crystal displays. They have also evolved by having enhanced internal controller technology, including recent advances by Glibarco, Inc. in the marketing of its THE ADVANTAGE™ line of fuel dispensers. These dispensers include card readers to enable credit cards to be read by the gas dispenser, with communications back to the credit card issuer to ascertain if the credit card is valid. However, some customers have difficulty using the technology because of lack of familiarity with the procedures required. Accordingly, it would be helpful to users of that sort to have as much customized assistance to direct them in the use of the self-service dispenser. Also, for all users, the option of advertising additional products or services for sale would be desirable to the service station operator. A prior effort to provide a video screen prompt of this sort is disclosed in U.S. Pat. No. 5,027,282 to Hollidge. The Hollidge approach is designed to control all display functions of the entire dispenser by a video disk player, which outputs video images to the screen, with some interactivity between the user and the disk being made possible.

The present invention permits advertisements or other programming to be presented to the customer during the fueling operation. In fact, the present invention, by being tied in with other service station operations, permits overall enhancement of the marketing of service station capabilities.

Also, the present invention has advantages over the prior displays which displayed only single line instructions or information to a customer. Instead, instructions are given in a video format, with which there is widespread familiarity, rather than a display using technologies such as LCD's or LED's. Customer ease-of-use is enhanced, not to mention the very much increased versatility of the types of displays capable on a raster-scannable display. Even for simple word messages, fonts can be customized, logos can be included, and the like. Accordingly, there are numerous upgrades from prior gasoline dispensers that would be desirable.

The present invention contemplates a multimedia type display, including both video display of prerecorded or live video programming, as well as graphics-generated display pertinent to assist the customer in the stages of a fueling transaction or otherwise to interface with the customer, such as to present advertising. The display of both of these types of information on a single screen entails displaying both analog video signals as well as digital computer signals. Prior efforts to display both types of signals at once have almost invariably entailed the digitization of the video signal, requiring large amounts of memories and very high speed electronics, thus adding greatly to the cost. For a mass production, low cost item, the implementation of such expensive technologies is undesirable.

Thus, there still remains a need in the art for a low cost multimedia controller, particularly for use in a fuel dispenser.

SUMMARY OF THE INVENTION

The present invention fulfills this need in the art by providing an apparatus for dispensing fuel at a retail site including a fuel dispenser having a raster-scannable display of information to a customer. A circuit means is included to generate graphics information concerning transactions for display on the raster-scannable display. A video signal source supplies video signals to the fuel dispenser to be displayed on the raster-scannable display. The circuit means is capable of selectively directing graphics information concerning transactions or video signals or a combination of them to the raster-scannable display. In a preferred embodiment, the video signals are analog signals as directed to the raster-scannable display. Digital signals could be used but are not presently preferred.

The fuel dispenser may have a user-actuable portion to permit customer responses to be communicated to the circuit means. Typically, the dispenser has a fuel meter communicating data about fuel dispensed to the circuit means.

In one embodiment the dispenser circuit means includes a first circuit associated with a reader for cards having magnetic stripes and a second circuit associated with the raster-scannable display. Other card forms, such as smart cards having embedded electronics, could be used with appropriate card readers. The first circuit has a first communication link to an external card-verifying authority and a second communication link to the second circuit. The second circuit has a first communications link to the video signal source and a second communications link to the first circuit. The second circuit may convert one of the video or graphics signals to be compatible with the other one of the video or graphics signals, such as both RGB, both Composite video or both S-Video.

The second circuit may include a beginning-of-program detector for the video signals and be designed to start directing video signals to the raster-scannable display only at detected program beginnings. Preferably, the second circuit selectively directs graphics information concerning transactions or video signals or a combination of them to the raster-scannable display, as instructed by signals provided by the first circuit. Also in a preferred embodiment, the first circuit provides signals to the second circuit to determine the placement of graphics information concerning transactions on the raster-scannable display with video information and the second circuit uses signals provided by the first circuit to determine to the placement of graphics information concerning transactions on the raster-scannable display with video information.

Preferably, the raster-scannable display is a liquid crystal display. Of course, other raster-scannable displays such as CRT's could be used.

In a preferred embodiment a plurality of the fuel dispensers are provided and the video signal source supplies the same video signal to all of the plurality of fuel dispensers. Alternatively, the video player can provide individual video signals to each fuel dispenser.

In addition to a fuel dispenser-specific embodiment, the invention provides a general-purpose multimedia display including a raster-scannable display of information and a circuit means to generate graphics information for display on the raster-scannable display. A video signal source supplies video signals to the circuit means to be displayed on the raster-scannable display, and the circuit means is capable of selectively directing graphics information or video signals or a combination of them to the raster-scannable display. The general purpose display may be configured as discussed above in environments other than in fuel dispensers.

The invention also provides a multimedia display apparatus including a raster scannable display of information and a circuit means to generate graphics information for display on this raster-scannable display, a video signal source supplying video signals to the circuit means to be displayed on the raster-scannable display, and a beginning-of-program detector for the video signals coupled to said circuit means to start directing video signals to the raster-scannable display only at detected program beginnings, wherein the circuit means is capable of selectively directing graphics information or video signals or a combination of them to the raster-scannable display. The apparatus may include a user-actuable portion to permit responses to be communicated to the circuit means. The beginning-of-program detector may detect a black level in a visual signal portion of the video signals, or a cue in the audio portion or in a synchronization signal.

The invention further provides a method of dispensing fuel at a retail site including providing a fuel dispenser having a raster-scannable display of information, generating graphics information concerning transactions for display on the raster-scannable display, supplying video signals to the fuel dispenser to be displayed on the raster-scannable display, and selectively directing graphics information concerning transactions or video signals or a combination of them to the raster-scannable display. Preferably, the supplying step includes supplying the video signals as analog signals. Digital signals could be used but are not presently preferred. If the providing step includes providing the fuel dispenser with a user-actuable portion, the method may include communicating responses through the portion to affect the graphics information.

The method may further include communicating data about fuel dispensed to affect the graphics information. The method may also include reading information on cards having magnetic stripes and processing the magnetic stripe information to affect the graphics or video information. This may include communicating magnetic stripe information to an external card-verifying authority.

In one embodiment the method includes detecting beginnings of video programs in the video signals and starting to direct video signals to the raster-scannable display only at detected program beginnings.

The method preferably includes identifying synchronization signals in the video signals and establishing graphics information signals synchronized with the video signals. It also preferably includes determining the relative placement of graphics information concerning transactions on the raster-scannable display with video information.

In one embodiment the method may include converting one of the video or graphics signals to be compatible with the other one of the video or graphics signals, such as both RGB, both Composite video or both S-Video.

In a preferred embodiment the supplying step includes supplying a plurality of the fuel dispensers with the same video signal.

The invention further includes a general-purpose method of displaying graphics information and video information. This method includes providing a raster-scannable display of information, generating graphics information for display on the raster-scannable display, supplying video signals to be displayed on the raster-scannable display, and selectively directing graphics information concerning transactions or video signals or a combination of them to the raster-scannable display. The general purpose method may proceed as discussed above in connection with proceedings other than fuel dispensing.

BRIEF DESCRIPTION OF THE DRAWINGS

The invention will be better understood after a reading of the Detailed Description of the Preferred Embodiments and a review of the drawings in which.

DETAILED DESCRIPTION OF THE PREFERRED EMBODIMENTS

Figure 1:
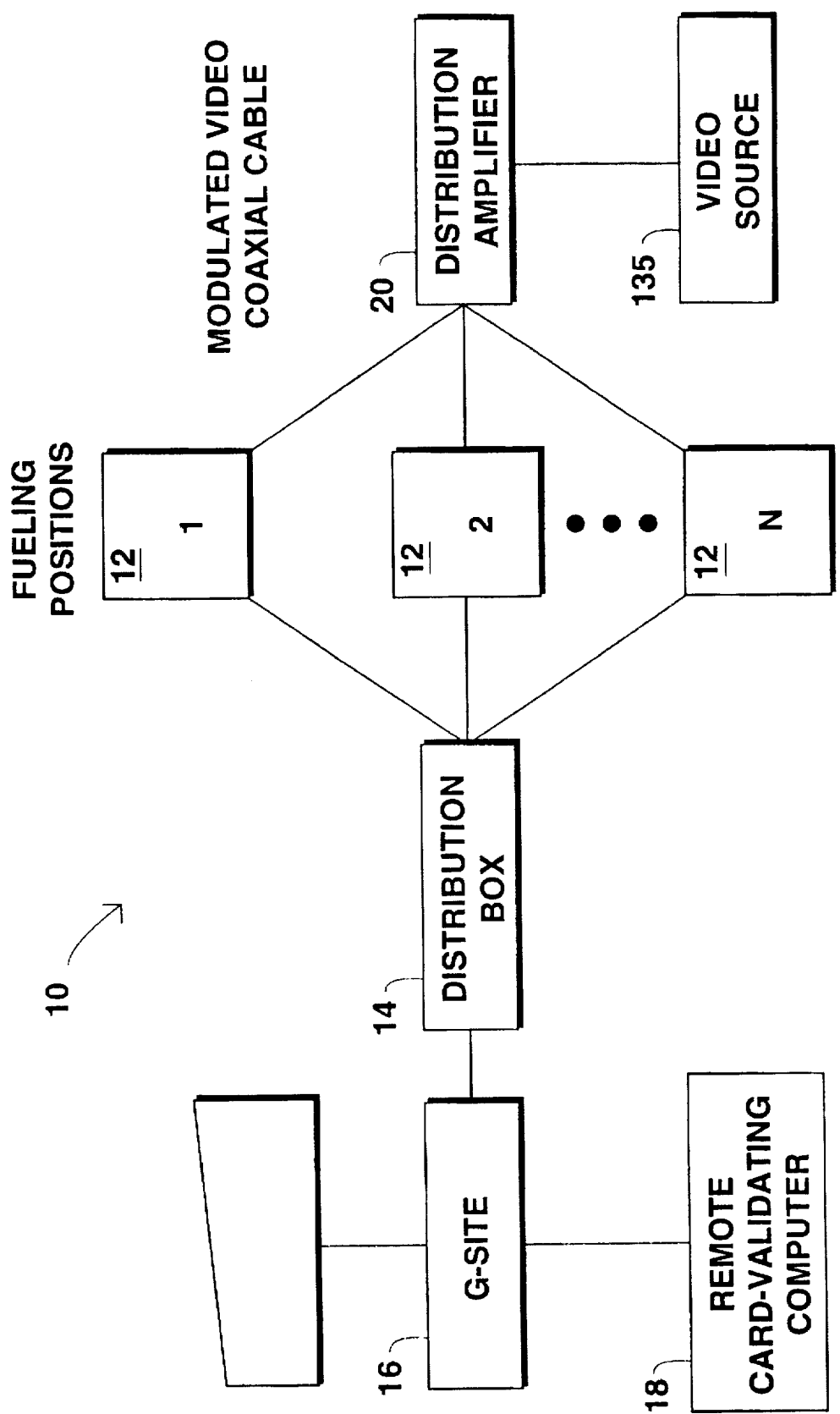
FIG. 1 is a block diagram of a service station illustrating major components of a preferred embodiment according to the present invention as linked together.

As seen in FIG. 1, a service station 10 has on site a plurality of fuel dispensers 12 connected through a single distribution box 14 to a site controller 16. The site controller 16 is preferably the G-Site system controller sold by Gilbarco, Inc. of Greensboro, N.C. The controller 16 serves as an overall system controller for the multiplicity of fuel dispensers 12. It has a link to a remote credit- or debit-card-validating computer 18, such as a telephone link. The computer 18 may be hundreds or thousands of miles away from the service station, at the site of a card-issuing authority or the like.

The relationships of the dispensers 12, distribution box 14, controller 16, and computer 18 are conventional as regards the card-validating function. The controller 16 serves as a point-of-sale device somewhat like a cash register manned by an attendant, typically located in a kiosk or other store facility.

Each of the dispensers 12 is supplied with a video signal from a video source 135 through a distribution amplifier 20. It should be appreciated that each of the dispensers 12 is supplied with exactly the same signal, decreasing the investment required in video sources 135. Alternatively, of course, multiple video sources could be provided if desired. However, an important advantage of the invention is that it makes possible the use of only a single source. The source may be any conventional source of video signals such as a video tape recorder, a video disk, a live camera, an over-the-air or over-cable reception, or the like.

Figure 2:
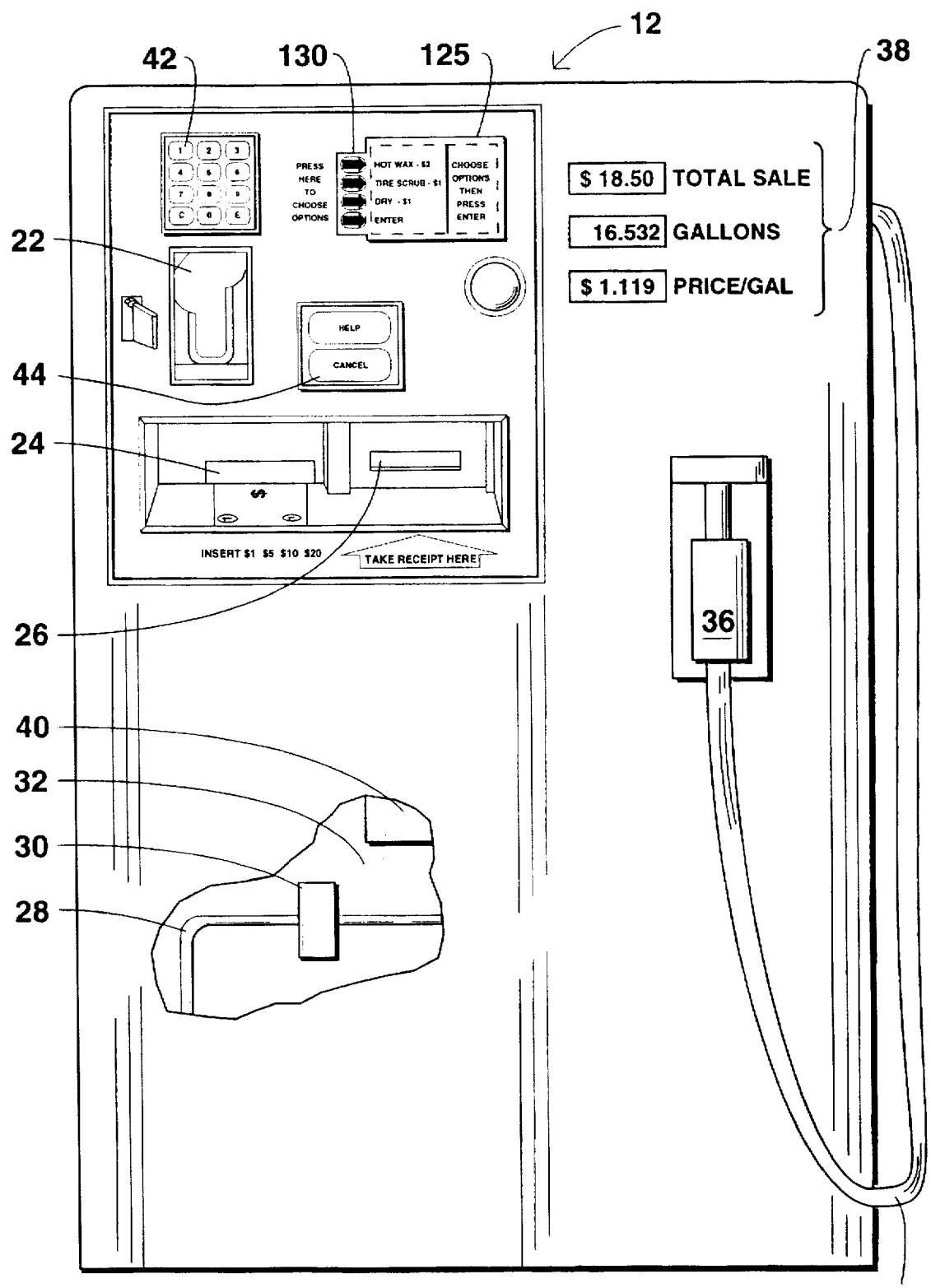
FIG. 2 is an elevational view of a fuel dispenser of FIG. 1, partially broken away.

Turning now to FIG. 2 which shows an elevational view of one of the dispensers 12, the dispenser includes a conventional nozzle 36 connected through a hose 34 to the dispenser housing, for dispensing gasoline or other fuel in a conventional fashion. The fuel is supplied from an underground reservoir through a conduit 28 to the hose 34. A metering device 30 from the conduit 28 ascertains the volume of fuel delivered through the conduit 28 and communicates that data over a line 32 to microprocessor 40 in the dispenser 12. The volume is, of course, used to compute and display the transaction data on conventional transaction indicia 38.

Figure 3:
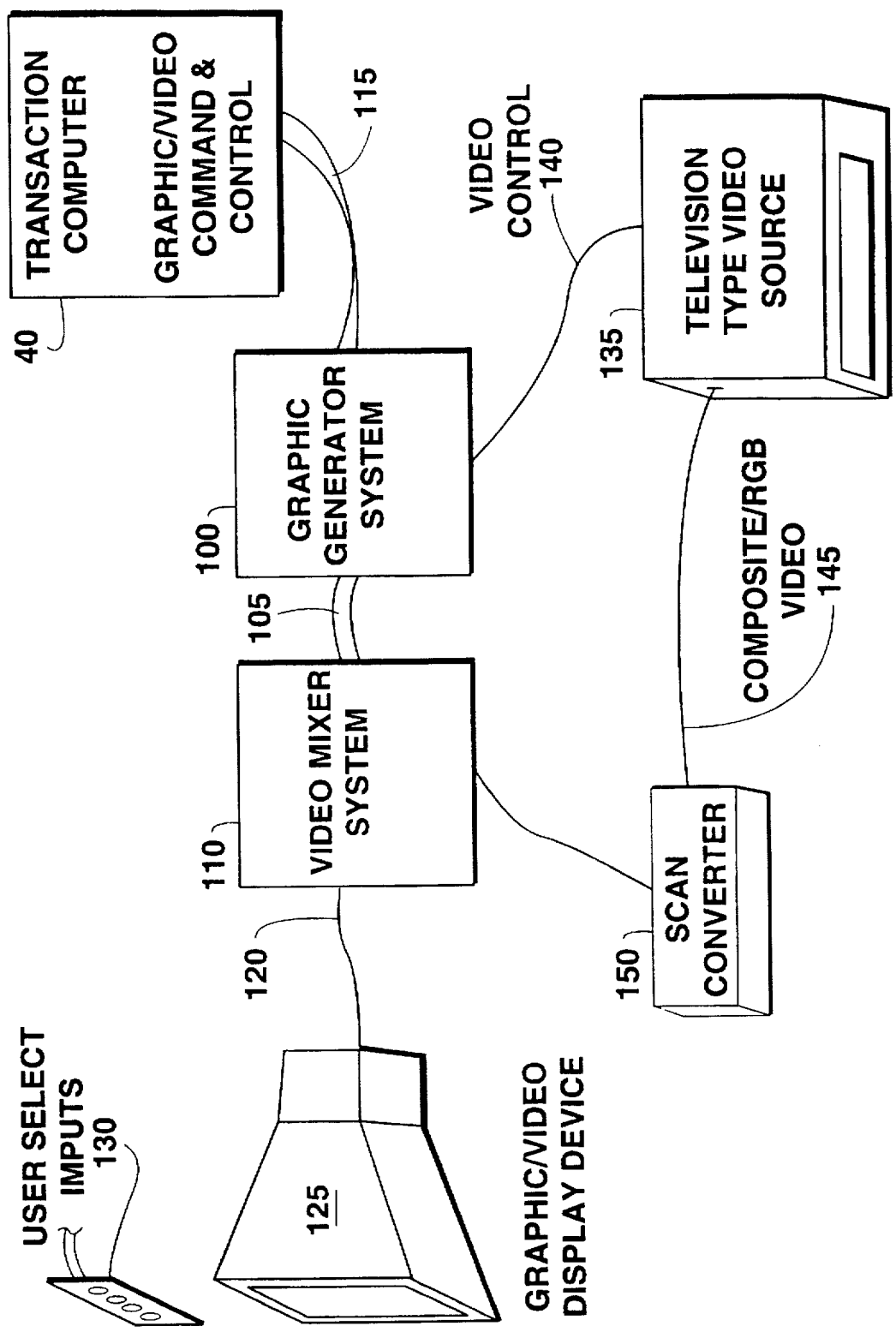
FIG. 3 is a block diagram of various components of the electronics used in a dispenser according to a preferred embodiment.

The dispenser also includes a magnetic stripe card reader 22, a cash accepter 24, and a receipt printer 26, all of any desired design. The transactions in which the components 22,24,26 are involved are computed and ascertained by the metering device 30 which also calculates and displays the transaction indicia 38. The metering device 30 outputs signals to a transaction computer 40 as is conventional in products such as the Glibarco line of CRIND (Card Reader IN Dispenser) dispensers sold under the trademark THE ADVANTAGE™. Historically, that transaction computer 40 outputs a control signal to a single-line display to aid a customer in working through a fueling transaction. In the present invention, the transaction computer outputs graphic/ video command and control data over line 115, as shown in FIG. 3. However, the changes to the computer 40 are limited to upgrading from the prior CRIND processor to have a wider range of available display messages, as well as to have programmed within it desired placement of those messages on a video screen.

Referring back to FIG. 2, the video screen 125 can be seen displaying information concerning a carwash transaction which can be elected by a customer in combination with a fueling transaction. Associated with the video display 125 is a keypad 130 similar to those conventionally used with bank automated teller machine displays. That is, a plurality of keys 130 are aligned with the raster-scannable display 125 so that the effect of pressing one or more of the keys 130 is explained to a user by the display on the screen 125. Other keypads 180 on other sides of the display 125 may be provided, or the one keypad may be located on another side. Additional keypads 42,44 are provided for further transaction entry data to the control computer 40, in conventional fashion. If desired, the apparatus could be configured for data input through a touch screen.

Referring to FIG. 3, the relationship of the transaction computer 40 and the other electronic components shown in FIGS. 3-5 to effect the display on raster-scannable screen 125 will be discussed in detail. As will be apparent, the display on raster-scannable screen 125 can be a computer-generated graphics display, as supplied by the transaction computer 40. Alternatively, it can be a strictly video display from video source 135, or some combination of the two displays, as will be discussed in further detail.

The integration of video and graphics in a single display introduces a new vehicle of user interface. Typical user interface systems rely on the conveyance of information to the user by graphical representation of words on a display media designed for that purpose only. Often the same display that can utilize graphical information from a computer generated source can also utilize television type video information. The major drawback to this integration is the lack of methods for providing a common signal timing upon which to allow the display media to display each kind of video simultaneously. The invention provides just such a method which is superior and less costly than current art proposals for accomplishing this task.

This invention can be applied to a CRT (cathode ray tube) device, a LCD (liquid crystal display) device, a gas plasma device, or any other device that is capable of displaying television type video. These are referred to generally herein as raster-scannable displays. An LCD color display is preferred. Television type video can include conventional CGA, EGA, and VGA video type sources. In such display media, there are three methods which are commonly used to transport video and graphics systems from a generating source to the display media, these being: RGB video, S-video, and Composite video. All three of these methods perform the same functions with the difference being the ease of signal handling for Composite video, high display resolution for RGB, and both ease and high resolution for S-video. The present invention is independent of these three transmission methods with the acknowledgment that conventional circuits can be used to alter one of the transmission methods to any of the other two.

All three of the described video signal methods utilize the same basic timing constituents to format display information for the display device. There are two basic parameters that describe the timing constituents, and these are: video line display timing and video from a display timing. In the technology of the art, these two concepts are often described as: horizontal display timing and vertical display timing. These two timing parameters are related and together create the space, timing relationships needed to display information for what is commonly referred to as television. This method of information display is commonly called raster scanning.

Raster scanning involves taking a picture of a two-dimensional image (like a simple photograph) and cutting the image up into thin horizontal slices. Conventional television cuts an image into 525 horizontal slices to form one picture. With the image sliced into thin lines, each line can be chopped again vertically to form a line of small pieces which, when placed side by side, form the original line. The raster can process takes advantage of this slicing process which breaks a huge two-dimensional image into small pieces. Each fragment (called a pixel) of the horizontal line is transmitted serially through one of the three aforementioned transmission methods with a defined transmission rate.

The receiver of these pixels operates at the same speed as the transmitter and arranges the pixels in the same order in which they were sent. When the transmitter has sent all the broken pieces to the horizontal line, a synchronization pulse called a horizontal sync indicator is sent to the receiver to indicate that the transmitter is about to send the next line of horizontal pixels. After all of the lines of horizonal image information are sent to the receiver of the image, the receiver will have successfully reconstructed the original two-dimensional image. At this time, the transmitter sends which is call a vertical sync indicator which tells the receiver that the transmitter will be sending another sliced-up image.

The transmitted images individually represent no movement, but form in succession the space time relationship of a moving object. Thus, moving images can be created from the successive transmission of still images.

Whether transmitting still or moving images, it is the space timing relationship set up by the horizontal and vertical synchronization indicators which allow the image reproduction process to operate. These two indicators are exploited by a preferred embodiment of the invention to allow for the synchronization of two simultaneous images, graphic and television video, to be incorporated on same display media at the same time.

Conventional methods of attempting this incorporation involve the conversion of the television video into digital data which is then mathematically added to a digital graphical display format. This method is very expensive because of the processing that has to be accomplished in the space time relationship of the video signal. Also, digitizing television type video is cumbersome and the amount of memory required to store the digital images is expensive. For example, to represent a digital image of quality comparable to the original analog image would require a minimum of 13 million bits of computer storage. And, all 13 million bits need to be manipulated every 16 milliseconds. This represents very high costs for fast memories and hybrid digital converters.

FIG. 3 illustrates the basic components of a preferred embodiment of the invention. Much of this system can be reconfigured, and it is the purpose of the figure to illustrate but one example of the individual component functions. The television video source 135 is representative of one of any number of television compatible sources (i.e., VCR's, video disks live cameras, cable and radio transmission, etc.) The source is not important as long as video signal timing is used. A particularly significant advantage of the present invention is that the video signal can be handled totally in analog form, avoiding the expense of digitization. Component 150 is a scan rate converter which converts standard RS170 video levels and timing to the higher speed of high resolution data display systems such as EGA and VGA computer video interfaces. Component 150 is an optional component and is not needed when the computer graphics video timing can be made to operate at the standard RS170 levels and timing for television video.

Component 100 is representative of any number of graphic generation sources which output video in RGB, Composite or S-Video. Component 110 implements the synchronization between the graphics source 100 and the video source 135. Component 125 is any display media that is capable of displaying a raster scan image format. Two examples are liquid crystal displays and cathode ray tubes. Control input 130 may or may not be provided to the user to provide for input to the control system 40 which drives the display system through cable 115. Component 130 could be a button interface or a conventional touch screen interface which would allow the use to select information on the screen in response to the control functions of the computer driving the graphic/video system.

Transaction computer 40 connected at 115 sends graphic control information to the graphic generator system 110. This information can be any information that is normally expressed to the operator or user of a piece of equipment that would normally be represented on a graphic, single line or multi-line display. In a Glibarco CRIND product, this control display information is processed by the generic function of block 100 and sent to a single line media display. In the invention, this formatted graphic information is routed to the video mixing system which provides several functions that allow the normal single media graphic display information to be formatted with video information from a variety of television type video sources in order to be displayed together.

The invention utilizes the horizontal and vertical timing of the external television video to construct a compatible timing framework for the graphic video signals to be combined with the video. This is based on the premise that one of the sources, either the graphics or the video, must be controllable in regard to the generation of the synchronization information. Since the television type video has fixed synchronization information, it is preferred to devise a method in which the computer graphic generator can be manipulated in regard to the sync generation.

The video mixing system 110 provides information through cable 105 back to the graphic generator 100 which allows synchronization to be established. In order to do this, the video mixing system 110 extracts the horizontal and vertical timing indicators from the external television type video cable 145 and creates from these indicators a master clock frequency which the graphic generator 100 uses to create graphic information for the display media 125. Since this enables the base timing of the graphic generator to be derived from the external television type video by the video mixing device, the timing between the graphics and the external video will be synchronized and mixing can occur within the established timing framework.

Figure 4:
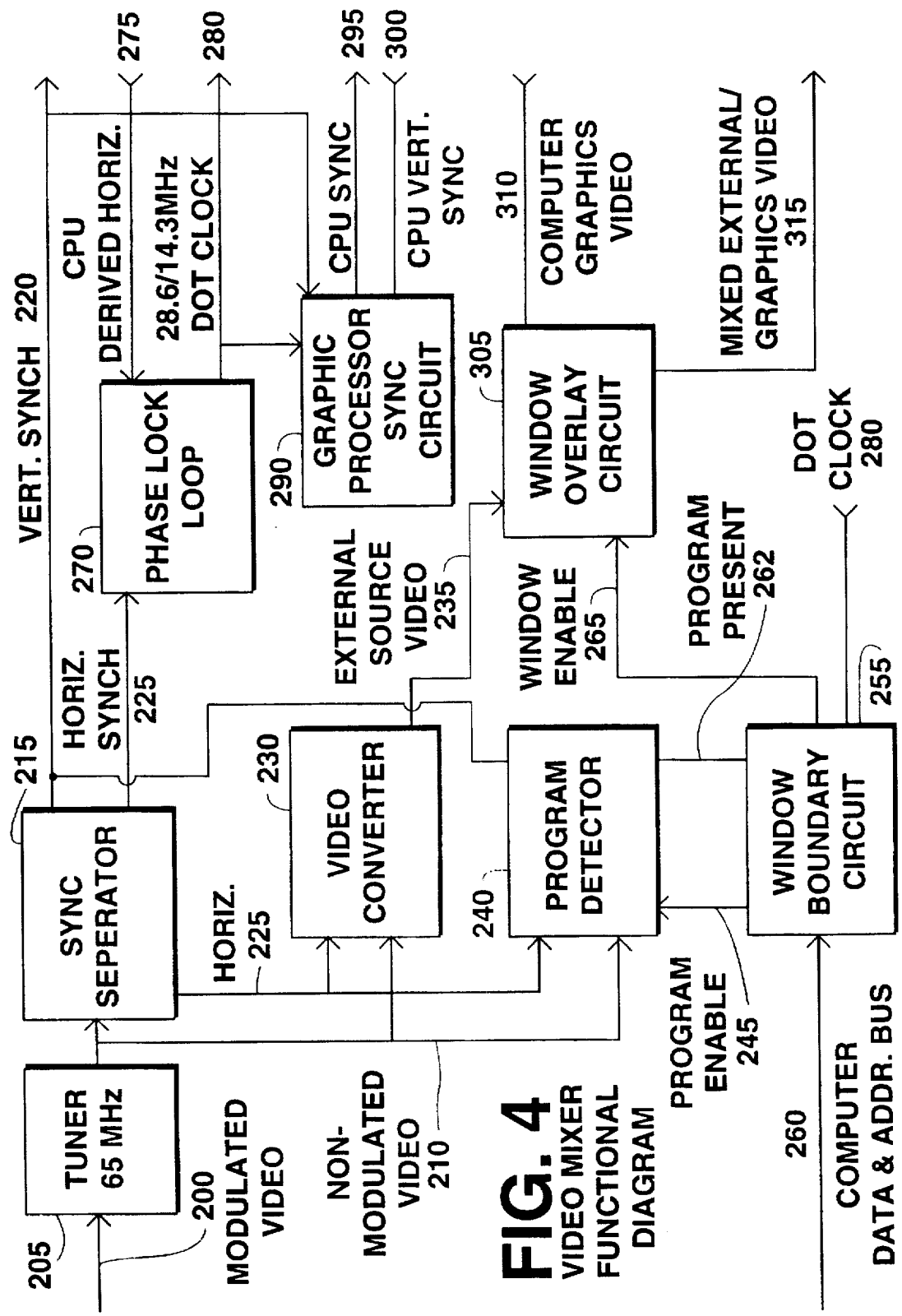
FIG. 4 is a functional diagram of various components of the electronics of the video/graphic mixer.

FIG. 4 illustrates the basic function blocks found in a preferred embodiment. There are a eight functions shown for the synchronization and mixing function, although some of them may not be needed, depending on what kind of video (RGB, Composite, or S-Video) is being mixed.

Block 205 is a tuner block which extracts the video signal if it has been modulated onto a radio frequency carrier. Modulation is usually done to preserve the quality and aid in the transmission of cable TV type signals. If the external video is not modulated onto a carrier, then block 205 is not needed.

Block 215 is a conventional device that has several common implementations. Its function is to separate the synchronization signals if the video signals of line 210 are composite or S-video signals. It outputs the vertical synchronization signals on line 220 and the horizontal on line 225. If RGB video is input on line 210, then synchronization information is sent with the signal by convention and the sync separation process is not needed. For composite and S-video signals, the sync separator extracts the horizontal and vertical synchronization indicators for use in the mixing process.

Block 230 is a conventional video standard converter designed to operate in whatever of the three modes best suits the external and graphics video for mixing. If the external video was composite and the computer graphics video of block 100 was in RGB, then the converter block 230 would be a conventional circuit to decode the external television type signal into RGB for mixing. Block 230 may also be designed to convert any one of the other three aforementioned video formats into any of the others (i.e., RGB into Composite, Composite to S-video, S-Video to RGB, etc.) If the external video and the graphics video are of a compatible type suitable for mixing, then block 230 is not needed.

Block 270 uses the synchronization information from block 215 to create a compatible timing framework for the mixing process. Block 270 uses a conventional principle called phase locking in order to establish the unique timing relationship needed to conduct the video/graphics mixing process. The structure and process of block 270 may be analogous to that described in U.S. Pat. Nos. 4,631,588 to Barnes et al. or 4,498,098 to Stell. The disclosures of those patents are hereby incorporated by reference. The output of block 270 provides a stable master dot (or pixel) clock signal 280 which the graphic generator 100 uses to create the graphic images to be mixed with the external video. The graphic generator 100 uses the dot clock signal on line 280 to generate a horizontal synchronization indicator 275 which is sent back to block 270 to be used in the phase lock process. It is this re-derivation of the horizontal synchronization 275 from the dot clock signal 280 which aligns the external and graphic video so that the mixing process is possible.

Block 290 further aligns the synchronization process defined by block 270 by coordinating the vertical synchronization of the external television type video and the graphics video. This process is simple once the horizontal synchronization has been established. The vertical synchronization process uses the derived dot clock signal 280 to measure the number of clock cycles difference which may exist between the external video synchronization signal 220 and a vertical synchronization indicator 300 generated by the graph generator. Note that the vertical synchronization indicator 300 for the graphic generator 100 is derived from the dot clock signal 280 in much the same way as the graphic horizontal signal 275. When a defined number of dot clock cycles of time difference exists between the external video vertical synchronization indicator 220 and the graphic generator vertical synchronization indicator 300, block 290 sends a synchronization signal over line 295 to the graphic generator 100 to tell it to realign the generation of the vertical synchronization indicator 300.

Block 255 determines which areas of the display media receive which signals by a timing function that interfaces with the derived dot clock 280 and the horizontal indicator 225. The derived dot clock 280 and the horizontal indicator 225 are logically combined to create a space time signal that is representative of an area of the display media.

Figure 6:
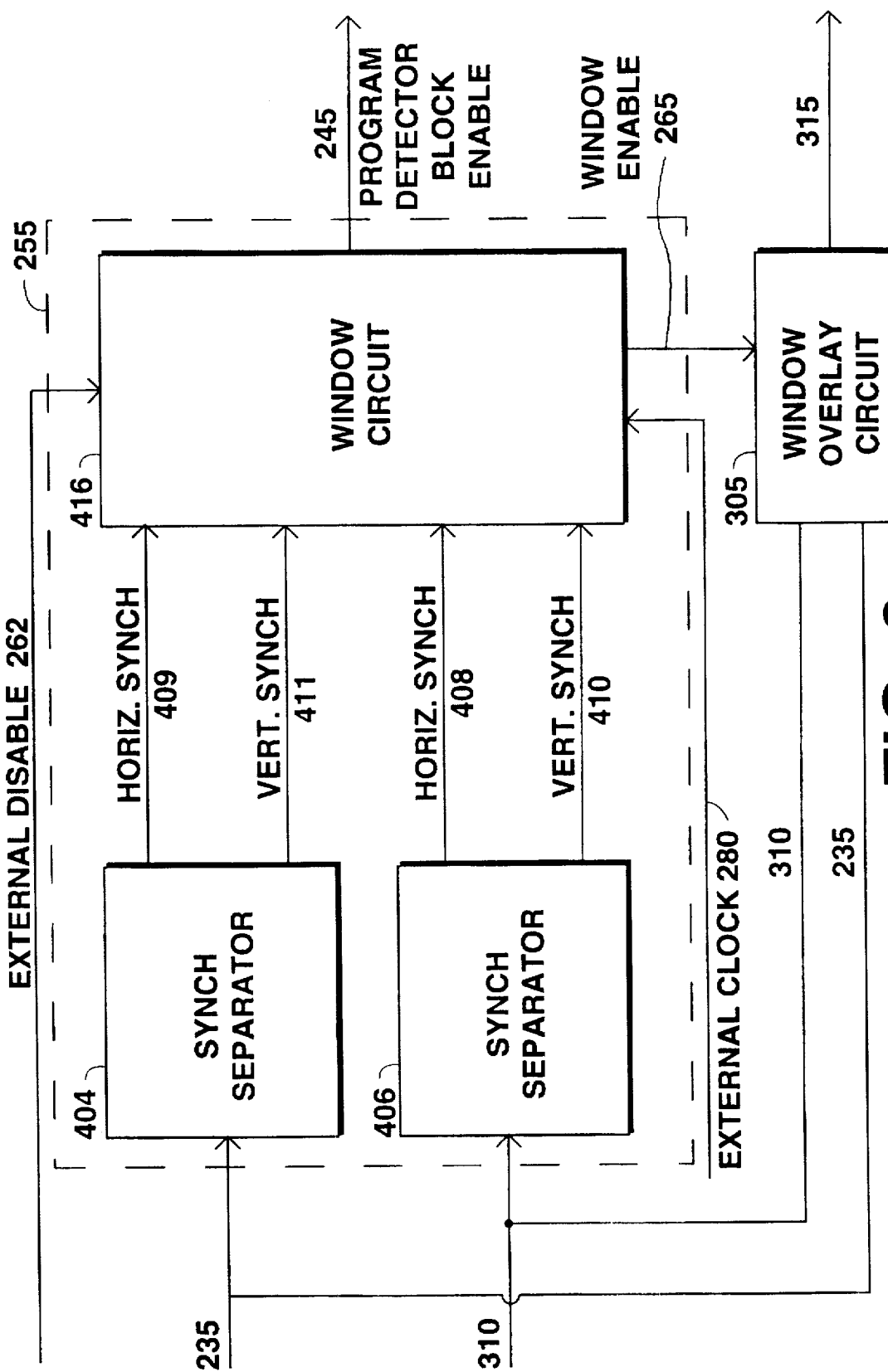
FIG. 6 is a block diagram of another of the components depicted in FIG. 4.

FIG. 6 shows the main functions of the windowing circuit 255. Signals 235 and 310 are provided to blocks 404 and 406 which strip timing information form the video signals. Alternatively, the stripped signals from separate 215 and the computer signal 310 may be used. Block 416 provides the windowing function of signals 400 and 402 utilizing the horizontal sync signal and the vertical sync signal 410.

Figure 7:
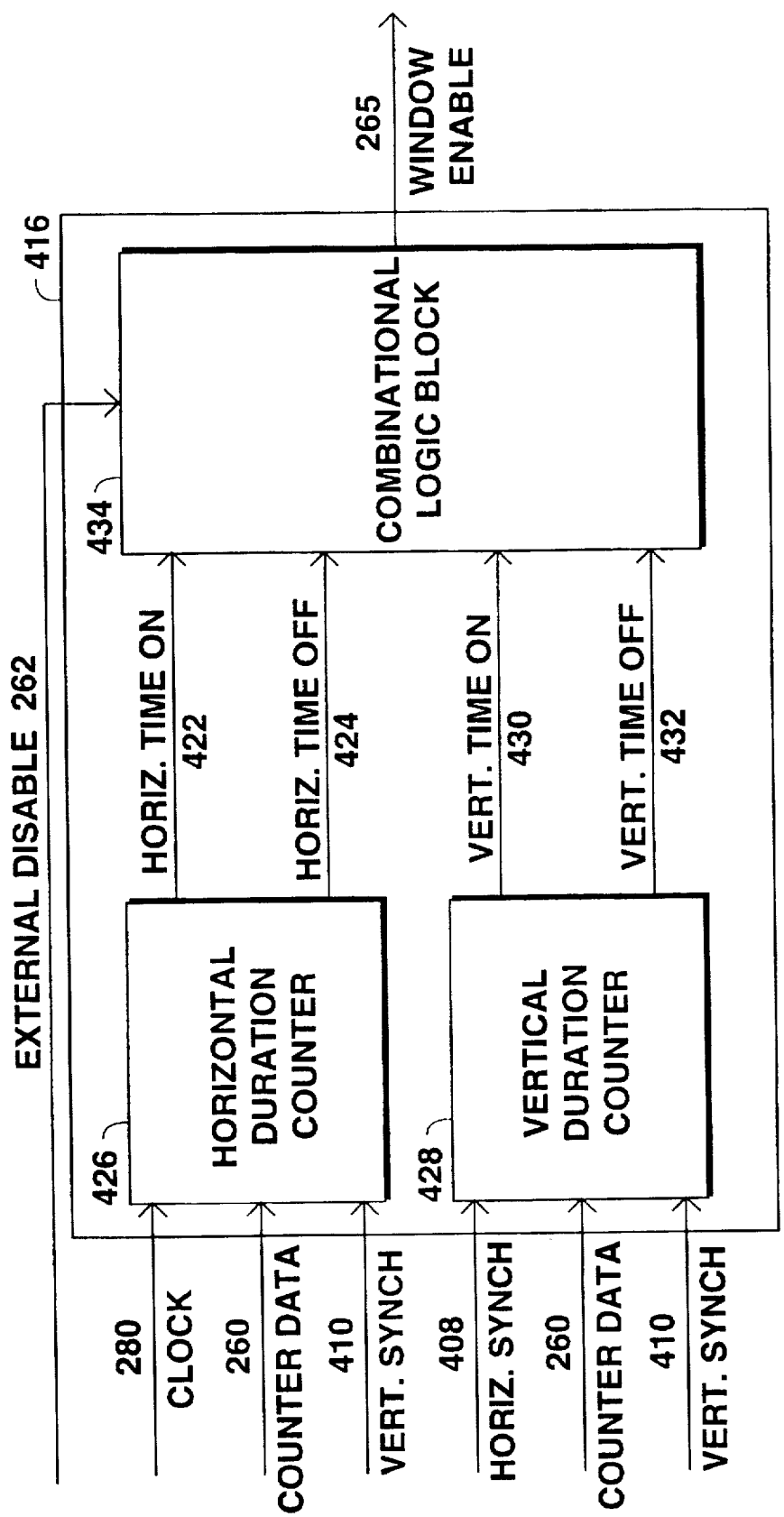
FIGS. 7 and 8 are block diagrams of two alternate embodiments of one of the components depicted in FIG. 6.
Figure 9:
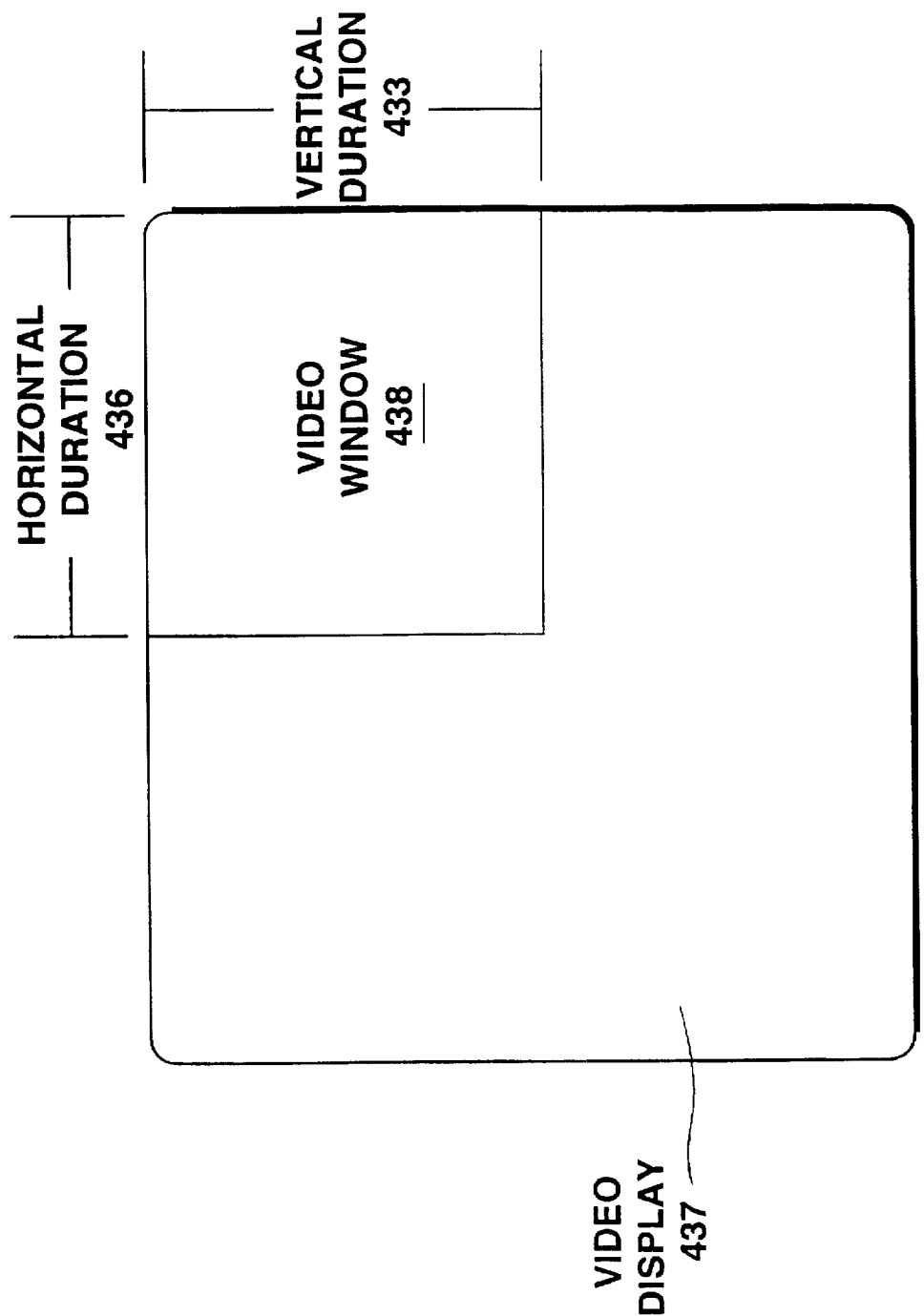
FIG. 9 is a schematic rendering of the relative positions of images to be displayed on a raster-scannable display of two signals to be displayed.

Block 416 can provide the windowing function in one of two ways, both of which create a space-timing relationship with the video signals. The first method utilizes the master clock signal 280 used to operate the graphic generator source. In the embodiment of FIG. 7, timing block 416 utilizes the graphic clock signals to count down the horizontal time duration 436 of the developed window as shown in FIG. 9. The clock signal 280 is routed into conventional counters 426 which control either the horizontal time on 422 or the horizontal time off 424. The vertical area 433 of the window 438 is accomplished by routing the horizontal sync pulses into counter 428 which controls with the vertical time on 430 or the vertical time off 432. Signals 422,424,430,432 are logically combined in block 434 to provide a signal 265 which indicates when the video window is active based on the loaded counts into counter blocks 426 and 428 from logic control bus 260 provided by computer 40. Control line 250 is provided for the circuit to be disabled by block 248 when video is not present. Vertical sync 410 is used to reset the counters 426 and 428 after each video frame in order to establish a new window 438.

Figure 8:
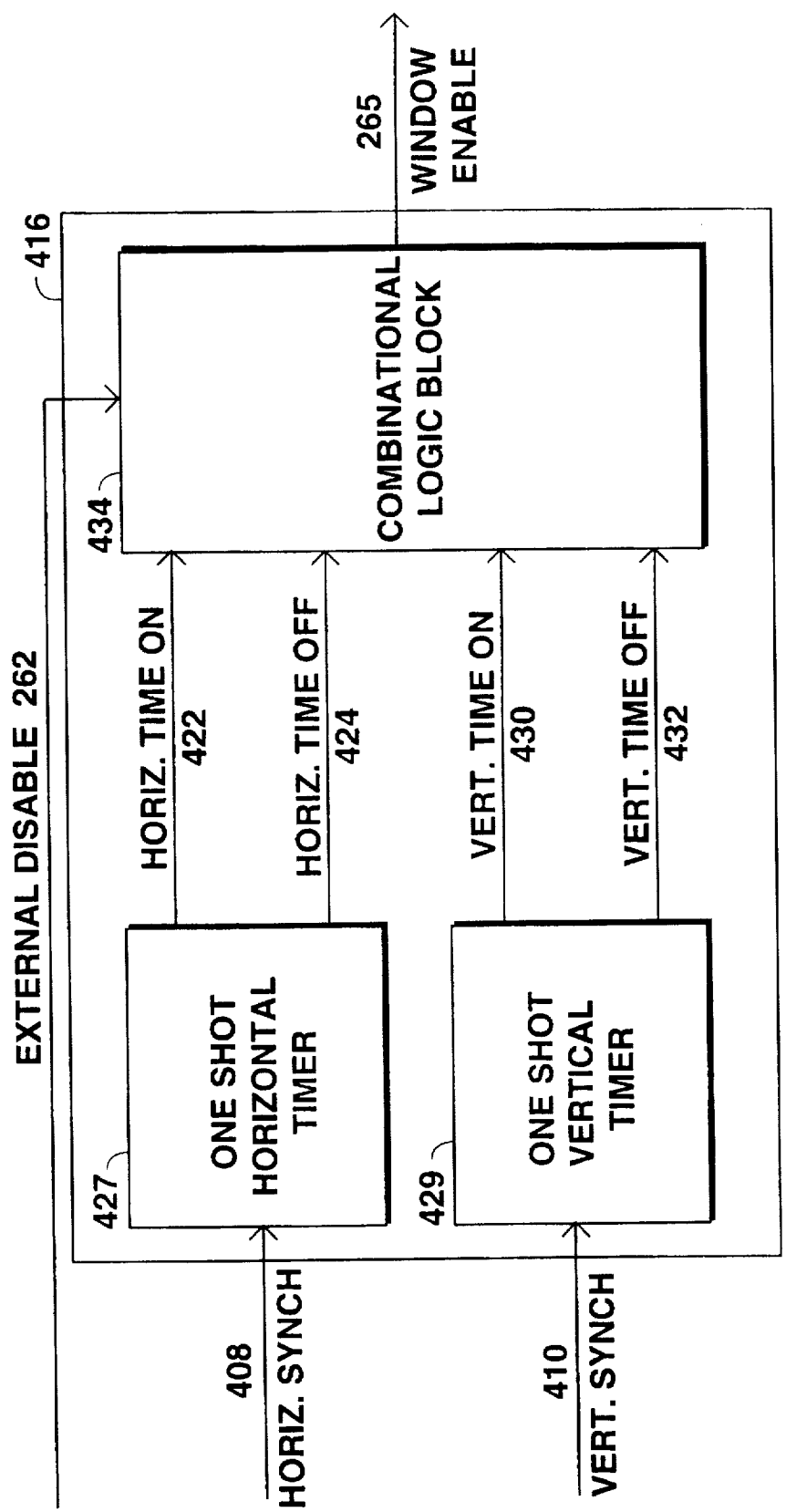

The second method utilizes analog timing components to effect the timing to develop the window. In the embodiment of FIG. 8, timing block 416 utilizes a conventional "one shot" type circuit to develop the horizontal time duration 436 of the window as shown in FIG. 9. The horizontal sync pulses are routed to activate the one shot block 427, which develops the time duration for the horizontal time to be displayed which control either the horizontal time on 422 or the horizontal time off 424. The vertical area 433 of the window 438 is accomplished by routing the vertical sync pulses into one shot 429 which control either the vertical time on 430 or the vertical time off 432. Signals 422,424, 430,432 are logically combined in block 434 to provide a signal 265 which indicates when the video window is active based on the time constants of one shot blocks 427 and 429 from logic control bus 260. Control line 250 is provided for the circuit to be disabled by block 248 when video is not present.

A window enable signal 265 produced by block 255 indicates that external video 235 is being mixed with the graphic video 310. Signal 265 operates on block 305 which contains conventional analog signal multiplexers which provide the straight overlay process or mixing process. This is to say that signal 265 logically places, either the graphics 310 or the external video on separate portions of the display media screen, or allow an analog mixing of the graphic 310 and external video 235 in a portion of the screen.

Block 240 is responsible for the continuous sequencing of external video material. Block 240 is intended to function with external video that has been created to repeat in a continuous loop and allows the user of the system to view the start of a video segment placed on the VCR tape or laser disc source.

Block 240 is especially useful in a video environment where multiple devices are trying to use a single video resource. It provides a means independent of the media for detecting the breaks between the source program material.

Block 240 explicitly addresses external video that has been created to repeat in a continuous loop or simply runs continuously and does not repeat, like television programming. Block 240 allows the user of a system which utilizes external video information to view the start of a video segment from an external source which could be a VCR tape, laser disc source, or normal television programming. The program detector 240 allows the user to queue and use a desired video segment on a continuous format in its entirety without starting in the middle of the segment.

Figure 5:
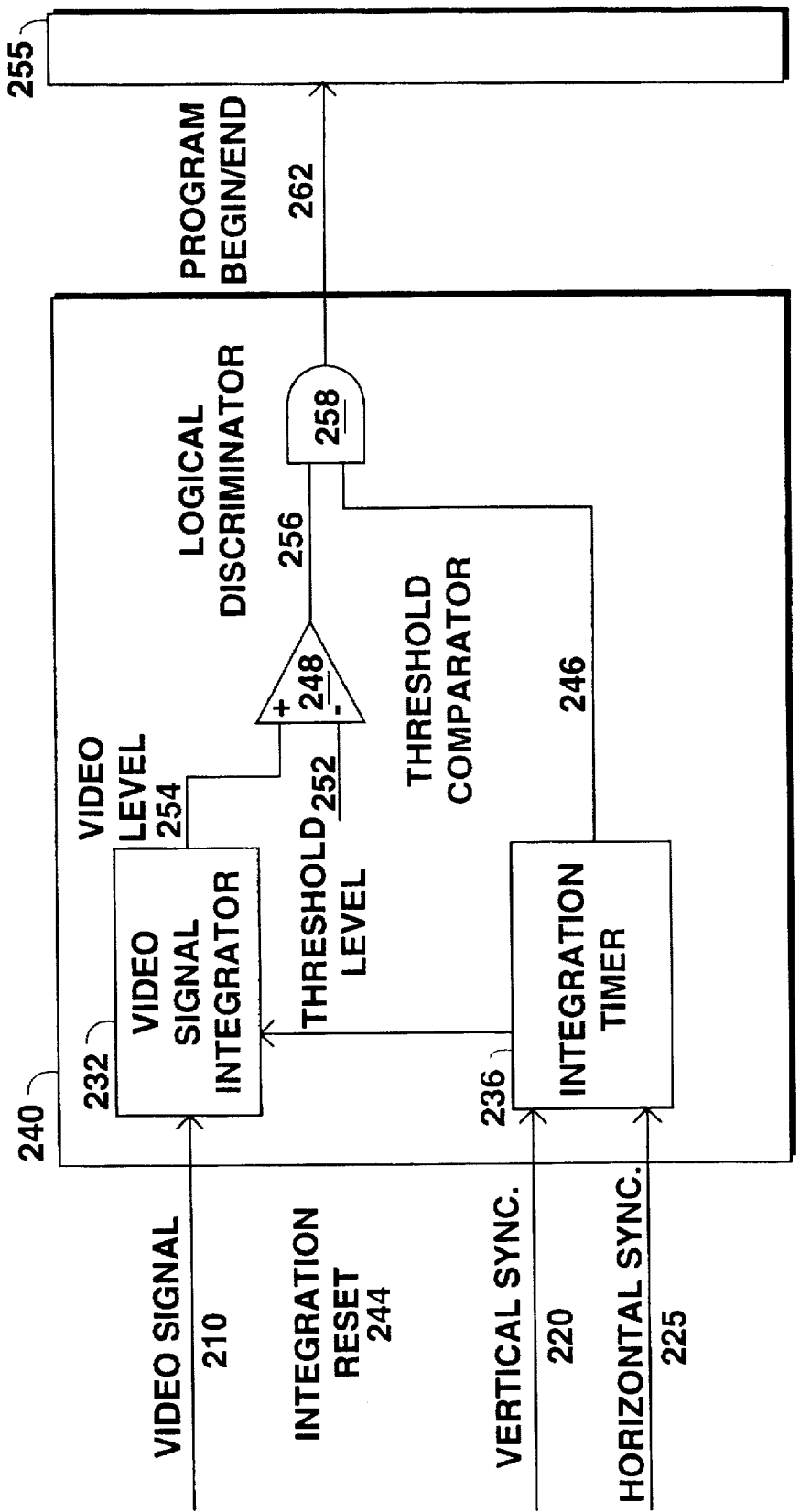
FIG. 5 is a block diagram of one of the components depicted in FIG. 4.

FIG. 5 illustrates in block form the operation of the program detector 240. Four conventional components combine to comprise the program detect function: a video signal integrator 232, an integration timer 236, a threshold detector 248 and a logical discriminator 258.

Block 232 performs a common voltage or current integration function. It integrates (or adds up over time) the actions of the video signal 210 to provide an output signal 254 which is indicative of the accumulated video signal over time. The function of integration is conventional and can be implemented with a number of common technologies.

Block 236 is an integration timer which controls the period over which the video signal 210 is accumulated. This timing function is commonly known in the art as an integration period and is fundamental mathematically for performing the integration process in block 232. The timing function of block 236 can be implemented with the timing of the video signals 220 and/or 225 with counters, or with an external clock with counters, or with an analog timing function. When the period of integration is determined by clock 236, then a signal 244 is sent to the video signal integrator 232 to reset the accumulated level so that a new level can be accumulated.

Block 248 is a conventional threshold comparator. Signal 252 applied to block 248 is a voltage threshold level which is indicative of the minimum amount of video signal level 210 that would be apparent over the video integration timer period 236 and is comparable to a black video level. A black video level is indicative of a video signal with no video program present. This signal 252 is at a level equal to the accumulation of this known black level over time and is compared with the accumulation level 254. The comparator 248 can thus indicate that the incoming video signal 210 has no active video present.

The result of the comparison of the accumulated video level 254 to the known accumulation of a black level 252 over the time dictated by timer 236 is sent to the logical discriminator 258. Block 258 in FIG. 2 is implemented with a conventional AND function, but could be constructed with any logical construct that performs the function in coordination with block 255. The logical function simply combines the indication of the end of the integration period 246 with the comparison result 248 to provide a logical output 262 to device 255 to indicate that a program end/beginning has occurred. This indication can then be used by the window boundary circuit 255 to enable the passage of the video signal through block 305 if the computer has signalled for video program on line 260.

Referring again to FIG. 3, the operation of the system begins when the command/control computer 40 attached to the graphic generator 100 through cable 115 instructs the graphic generator 100 to format and display graphic data to the user on display media 125. The graphic generator 100 has control of he video mixer 110 through cable 105 and can instruct the video mixer 110 with signals 260 to allow the graphic data 310 to be displayed to the user without external video mixing. Alternatively, it can instruct that video signals be displayed or a combination of the two in respective video screen portions. As a result of the graphic data 310 being placed on the display media 125 the user may or may not input requests to the control system through input 130. For example, in the display of FIG. 2, the user may select a carwash option through the use of one or more of the inputs 130. In either case, the command/control computer can request through cable 115 that the graphic generator 100 display graphics 310 and external video 235 simultaneously on display media 125. The control commands sent through cable 115 set up the size of the window with signals 260 into block 255. If the program detector 240 is implemented, then 240 will search the incoming video 210 for a gap between messages before allowing the mixing window to appear on the display media 125.

The invention is specifically designed to be used in conjunction with the inventions described in Glibarco, Inc.'s copending applications entitled "Video Display Control" of Hans Atchley and "Synchronization of Prerecorded Audio/Video Signals with Multimedia Controller" of Joseph Daniel Long, both filed on even date herewith. The disclosures of those two applications are hereby incorporated herein by reference.

Those of ordinary skill in the art will recognize that the invention as disclosed herein may be implemented in numerous embodiments which differ from the specific disclosure hereof. All such embodiments which fall within the scope of the appended claims are deemed to be within the scope of the patent.

What is claimed is:

1. An apparatus for dispensing fuel at a retail site including at least two fueling positions comprising:
   a fuel dispenser having a first raster-scannable display of information to a customer and a dispenser circuit associated with said fuel dispenser to generate digital graphics information concerning transactions for display on said first raster-scannable display,
   a second raster-scannable display of information to a customer and an additional circuit associated with said second raster-scannable display to generate digital graphics information concerning transactions for display on said second raster-scannable display,
   a single video signal source supplying continuously free-running video signals to said fuel dispenser to be displayed on said first raster-scannable display and to said second raster-scannable display, and
   wherein said dispenser and additional circuit selectively direct graphics information concerning transactions or video signals from said single video signal source or a combination of them to their associated raster-scannable displays.

2. An apparatus as claimed in claim 1 wherein said video signals are analog signals as directed to said raster-scannable display.

3. An apparatus as claimed in claim 1 wherein said fuel dispenser has a user-actuable portion to permit responses to be communicated to said dispenser circuit means.

4. An apparatus as claimed in claim 1 wherein said dispenser has a fuel meter communicating dam about fuel dispensed to said dispenser circuit means.

5. An apparatus as claimed in claim 1 wherein said circuit means includes a first circuit associated with a reader for cards having magnetic stripes and a second circuit associated with said raster-scannable display.

6. An apparatus as claimed in claim 5 wherein said first circuit has a first communication link to an external card-verifying authority and a second communication link to said second circuit.

7. An apparatus as claimed in claim 5 wherein said second circuit has a first communications link to said single video signal source and a second communications link to said first circuit.

8. An apparatus as claimed in claim 7 wherein said second circuit includes a beginning-of-program detector for the video signals and starts directing video signals to said raster-scannable display only at detected program beginnings.

9. An apparatus as claimed in claim 7 wherein said second circuit selectively directs graphics information concerning transactions or video signals or a combination of them to said raster-scannable display, as instructed by signals provided by said first circuit.

10. An apparatus as claimed in claim 9 wherein said second circuit uses synchronization signals in the video signals to establish graphics information signals synchronized with the video signals.

11. An apparatus as claimed in claim 9 wherein said first circuit provides signals to determine the placement of graphics information concerning transactions on said raster-scannable display with video information and said second circuit uses signals provided by said first circuit to determine the placement of graphics information concerning transactions on said raster-scannable display with video information.

12. An apparatus as claimed in claim 1 wherein said raster-scannable display is a liquid crystal display.

13. An apparatus as claimed in claim 7 wherein said second circuit converts one of the video or graphics signals to be compatible with the other one of the video or graphics signals.

14. An apparatus as claimed in claim 1 further comprising a plurality of said fuel dispensers and wherein said single video signal source supplies the same video signal to all of said plurality of fuel dispensers.

15. An apparatus for dispensing fuel at a retail site comprising:
   a. a plurality of fuel dispensers each having
      1) a raster-scannable display of information to a customer associated with each fueling position,
      2) a first circuit associated with each dispenser and associated with a reader for cards having magnetic stripes and having a first communication link to an external card-verifying authority to generate graphics information concerning transactions for display on the associated raster-scannable display for the associated fuel dispenser, 3) a second circuit associated with each raster-scannable display and having a communication link to said first circuit, 4) a fuel meter communicating data about fuel dispensed to said first circuit and 5) a user-actuable portion to permit responses to be communicated to said first circuit, and b. a single video signal source supplying continuously free-running video signals to said second circuit in each of said fuel dispensers for display on each raster-scannable display, wherein said second circuit of each dispenser 1) uses synchronization signals in the video signals to establish graphics information signals synchronized with the video signals, 2) selectively directs graphics information concerning transactions or the analog video signals from said single video signal source or a combination of them to said associated raster-scannable display as instructed by signals provided by said first circuit, 3) uses signals provided by said first circuit to determine the relative placement of graphics information concerning transactions and video information on each raster-scannable display, and 4) includes an beginning-of-program detector for the video signals and starts directing video signals to each raster-scannable display only at detected program beginnings.

16. A method of dispensing fuel at a retail site comprising:

providing a first fuel dispenser having a raster-scannable display of information, providing a second fuel dispenser having a raster-scannable display of information, generating graphics information concerning transactions for display on each raster-scannable display, supplying continuously free-running video signals from a single video signal source to the fuel dispensers to be displayed on each raster-scannable display, and selectively directing graphics information concerning transactions or video signals from said single video signal source or a combination of them to the raster-scannable display associated with each fuel dispenser.

17. A method as claimed in claim 16 wherein the supplying step includes supplying the video signals as analog signals.

18. A method as claimed in claim 16 further comprising providing the fuel dispenser with a user-actuable portion and communicating responses through the user actuable portion to affect the graphics information.

19. A method as claimed in claim 16 further comprising communicating data about fuel dispensed to affect the graphics information.

20. A method as claimed in claim 16 comprising reading information on cards having magnetic stripes and processing the magnetic stripe information to affect the graphics information.

21. A method as claimed in claim 20 comprising communicating magnetic stripe information to an external card-verifying authority.

22. A method as claimed in claim 16 comprising detecting beginnings of video programs in the video signals and starting to direct video signals to the raster-scannable display only at detected program beginnings.

23. A method as claimed in claim 16 comprising identifying synchronization signals in the video signals and establishing graphics information signals synchronized with the video signals.

24. A method as claimed in claim 16 comprising determining the relative placement of graphics information concerning transactions on the raster-scannable display with video information.

25. A method as claimed in claim 16 comprising converting one of the video or graphics signals to be compatible with the other one of the video or graphics signals.

26. A method as claimed in claim 16 wherein said supplying step comprises supplying a plurality of the fuel dispensers with the same video signal.

27. A method of dispensing fuel at a retail site comprising:

a. providing a first fuel dispenser having a first raster-scannable display of information, a first circuit and a first user actuable portion, b. providing a second fuel dispenser having a second raster-scannable display of information, a second circuit and a second user actuable portion, c. communicating responses through one of the user-actuable portions of one of the dispensers to the circuit, d. reading information on cards having magnetic stripes, processing the magnetic stripe information in a first portion of the circuit and communicating magnetic stripe information to an external card-verifying authority, e. communicating data about fuel dispensed from a fuel meter to the circuit, f. supplying continuously free-running video signals from a single video signal source to each of the fuel dispensers to be displayed on each raster-scannable display, g. in each fuel dispenser, 1) identifying synchronization signals in the video signals and generating graphics information in the circuit concerning transactions for display on the dispenser's raster-scannable display synchronized with the video signals, 2) determining the relative placement of graphics information concerning transactions on the dispenser's raster-scannable display with video information, 3) selectively directing graphics information concerning transactions or video signals from said single video signal source or a combination of them to the dispenser's raster-scannable display, and 4) displaying the selectively directed graphics information or video information or a combination of them on the dispenser's raster-scannable display at the determined relative placements.

* * * * *